Dec. 7, 1926.
N. A. CHRISTENSEN
1,609,641
SEALING VALVE
Filed April 27, 1925
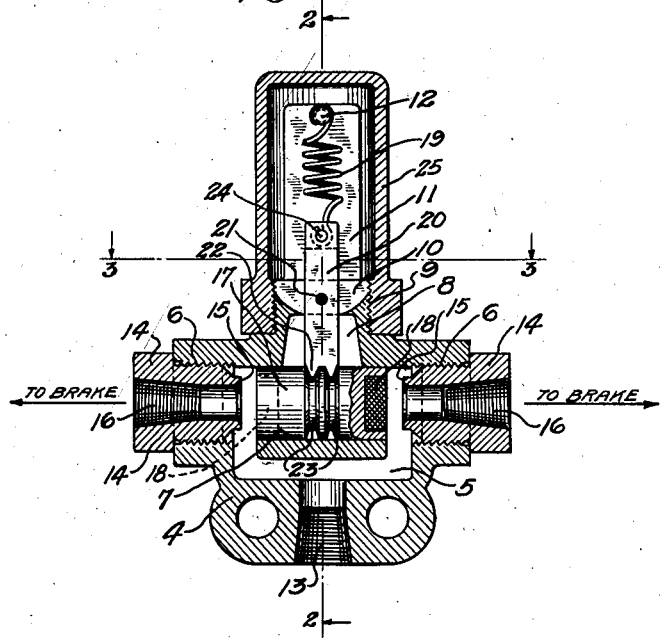
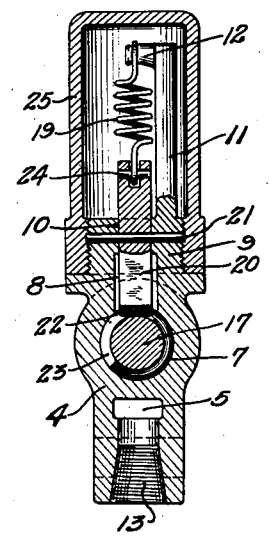
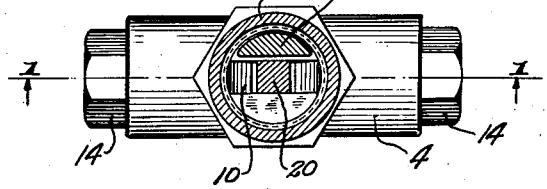
INVENTOR.
Niels A. Christensen
BY
Quarles & French
ATTORNEYS Patented Dec. 7, 1926.

1,609,641

UNITED STATES PATENT OFFICE.

NIELS A. CHRISTENSEN, OF MILWAUKEE, WISCONSIN.

SEALING VALVE.

Application filed April 27, 1925. Serial No. 26,163.

The invention relates to a sealing valve for automatically sealing the open end of a broken connection in compressed air lines, and more particularly air brake lines, so that when one of the brake lines becomes ruptured the other brakes will not be rendered inoperative by escape of air through the broken line.

The general object of the invention is to improve and simplify the construction of sealing valves of this character, and more particularly to provide a construction in which a single spring is associated with the sealing valve to hold it in an open position and yet permit it to move into sealing contact with the ruptured brake line.

The invention further consists in the several features hereinafter set forth and more particularly defined by claims at the conclusion hereof.

In the drawings: Fig. 1 is a vertical sectional view through a sealing valve embodying the invention, taken on the line 1—1 of Fig. 3;

Fig. 2 is a sectional view taken on the line 2—2 of Fig. 1;

Fig. 3 is a sectional view taken on the line 3—3 of Fig. 1;

The sealing valve includes a one-piece main casing 4 having a U-shaped duct 5 formed therein with tapped holes 6 communicating with the ends of said duct, a bore 7 alined with said holes and a passage 8 communicating with said bore and extending through a threaded boss 9, the upper end of said passage 8 being in the form of a milled slot 10, the boss 9 also having a spring-supporting projection 11 having a pin 12 projecting laterally therefrom, the air entering or leaving the casing through a tapped opening 13.

Bushings 14 having threaded ends engaging the tapped holes 6, a valve seat portion 15 and a tapped outer end 16 for connection with a pipe leading to the brake cylinder.

The sealing valve 17 is a cylindrical member slidably mounted in the bore 7 and having valve faces preferably made by inserting disks 18 of suitable composition material into recesses in the ends of said members 17, said disks 18 cooperating with the seats 15 to close off during a brake application the particular brake pipe in which leakage has developed.

The sealing valve is normally held in a floating and balanced position by means of a spring 19 and a connection between said spring and valve. This connection includes a lever 20 extending through the passage 8, guided by the slot 10, pivotally mounted on a pin 21 secured in the boss 9 and having a toothed lower end 22 which engages the sides of the spaced annular grooves 23 formed in the medial part of the member 17. The upper end of the lever 20 is slotted and carries a pin 24 to which one end of the spring 19 is anchored, the other end of said spring being anchored to the pin 12 on the support 11. The spring is under tension and hence any tendency for the valve 17 to shift laterally is resisted by the spring, through the connection above described, so that the valve normally occupies a medial position, as shown in Fig. 1. The connection above described enables a one-piece casing to be used and permits the valve to rotate or shift so that it may readily find its seat. A sealing cap 25, having threaded engagement with the threaded boss 9, fits over the support 11.

With this construction, the compressed air from the brake system is normally free to pass from the casing through the bushings 14 to or from the brake pipes and brake cylinders. If, however, one of the pipes communicating with one of the bushings 14 brakes, thereby causing escape of air through this pipe and hence a sudden reduction of pressure of air at one end of the valve as opposed to the other which has the air pressure on it, then said valve 17 will be shifted against the action of the spring 19 so that its face contacts with the seat 15 on that bushing 14 which communicates with the broken line, and as soon as the valve is seated the air pressure in the brake system keeps it seated and hence prevents any further escape of air from the system during a brake application and cuts off the broken line. It will thus be undrestood that a sudden flow of air through the bushing associated with the broken line creates enough difference in pressure between that end of the valve associated with this bushing and the other end of the valve so that the valve is shifted as above described. Thus the leaky air brake line is cut off from the main brake system, on each brake application, so that the other brake or brakes in the system can be operated.

I desire it to be understood that this invention is not to be limited to any specific form or arrangement of parts except in so far as such limitations are specified in the claims.

What I claim as my invention is:

1. In a sealing valve, the combination of a casing having an inlet and outlets, a valve slidably mounted therein for closing off either of said outlets, operable through a difference in air pressure at said outlets, spring means, and a lever connection between said spring means and valve to normally maintain the valve in balanced position.

2. In a sealing valve, the combination of a casing having an inlet and outlets, a valve slidably mounted therein for closing off either of said outlets, operable through a difference in air pressure at said outlets, a single spring, and means connecting said spring with said valve to normally maintain the valve in balanced position.

3. In a sealing valve, the combination of a casing having an inlet and outlets, a valve slidably mounted therein for closing off either of said outlets, operable through a difference in air pressure at said outlets, a single spring, and a lever operatively connecting said spring with said valve to normally maintain the valve in balanced position.

4. In a sealing valve, the combination of a casing having an inlet and outlets, a valve slidably mounted therein for closing off either of said outlets, operable through a difference in air pressure at said outlets, said valve having a central cylindrical portion provided with spaced annular grooves, a lever pivotally mounted within the casing and having one end in operative engagement with the sides of said groove, and a spring anchored to the casing and connected to the other end of said lever to normally maintain the valve in balanced position.

5. In a sealing valve, the combination of a casing having an inlet and outlets, a duct connecting said inlet with said outlets, a bore alined with said outlets and a passage communicating with said bore, a balanced valve slidably mounted in said bore for closing off either of said outlets and operable through a difference in air pressure at said outlets, a lever pivotally mounted in said casing and working in said passage and operatively connected with said valve, and spring means within the casing associated with the free end of said lever and influencing it to normally maintain the valve in balanced position.

6. In a sealing valve, the combination of a main casing having an inlet and outlets, a duct connecting said inlet with said outlets, a bore alined with said outlets, a threaded boss, a spring-support projecting from said boss and a passage extending through said boss to said bore, including a lever guide slot, bushings associated with said outlets and forming valve seats, a balanced valve slidably mounted in said bore and movable into engagement with either of said seats, a pivoted lever working in said passage and operatively connected at its inner end with said valve and having its outer end extending outwardly from said slot, a spring connected to the outer end of said lever and to said support to normally maintain the lever in a neutral position and hence normally maintain the valve in balanced position, and a cap mounted on said threaded boss and enclosing said spring, its support, and the outer end of said lever.

7. In a sealing valve, the combination of a casing having an inlet and outlets, a duct connecting said inlet with said outlets, a bore alined with said outlets and a passage communicating with said bore, a balanced valve slidably mounted in said bore for closing off either of said outlets and operable through a difference in air pressure at said outlets, a lever pivotally mounted in said casing and working in said passage and operatively connected with said valve, and a single spring within the casing associated with said lever and influencing it to normally maintain the valve in balanced position.

8. In a sealing valve, the combination of a casing having an inlet and outlets, a valve slidably mounted therein for closing off either of said outlets, operable through a difference in air pressure at said outlets, a single spring within said casing, and a lever within said casing operatively connecting said spring with said valve to normally maintain the valve in balanced position.

In testimony whereof, I affix my signature.

NIELS A. CHRISTENSEN.